United States Patent
Walawender et al.

(10) Patent No.: US 10,967,714 B2
(45) Date of Patent: Apr. 6, 2021

(54) COLLAPSIBLE SIDE DOOR LATCH MODULE

(71) Applicant: Ford Global Technologies, LLC, Dearborn, MI (US)

(72) Inventors: Chester Stanislaus Walawender, Livonia, MI (US); Eric Rinke, Plymouth, MI (US); Andrew Cusator, Louisville, KY (US); Sheri Reck, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 764 days.

(21) Appl. No.: 15/713,809

(22) Filed: Sep. 25, 2017

(65) Prior Publication Data

US 2019/0092145 A1    Mar. 28, 2019

(51) Int. Cl.
*E06B 3/00* (2006.01)
*B60J 5/04* (2006.01)
*E05B 79/06* (2014.01)

(52) U.S. Cl.
CPC .............. *B60J 5/0416* (2013.01); *E05B 79/06* (2013.01)

(58) Field of Classification Search
CPC ................................ B60J 5/0416; E05B 79/06
USPC ......................................................... 49/503
See application file for complete search history.

(56) References Cited

U.S. PATENT DOCUMENTS

| | | | |
|---|---|---|---|
| 5,071,179 A | 12/1991 | Brackmann | |
| 7,228,610 B2 | 6/2007 | Carter et al. | |
| 8,235,451 B2 * | 8/2012 | Jordan | E05B 83/36 |
| | | | 296/146.1 |
| 10,350,975 B2 * | 7/2019 | Kiwus | E05B 79/04 |
| 10,526,817 B2 * | 1/2020 | Gray | E05B 83/40 |
| 10,533,349 B2 * | 1/2020 | Suzumura | E05B 79/10 |
| 10,689,887 B2 * | 6/2020 | Gray | E05B 77/04 |
| 2002/0007598 A1 * | 1/2002 | Nishikawa | B60J 5/0451 |
| | | | 49/502 |
| 2005/0160776 A1 | 7/2005 | Batzner et al. | |
| 2006/0283091 A1 * | 12/2006 | Papi | B60J 5/0416 |
| | | | 49/502 |
| 2011/0167731 A1 * | 7/2011 | Zagromski | B60J 5/0416 |
| | | | 49/460 |
| 2011/0258935 A1 * | 10/2011 | Heller | B60J 5/0451 |
| | | | 49/502 |
| 2016/0290006 A1 | 10/2016 | Keller | |

FOREIGN PATENT DOCUMENTS

EP            0508580 B1     4/1995

* cited by examiner

*Primary Examiner* — Jerry E Redman
(74) *Attorney, Agent, or Firm* — David Coppiellie; Carlson, Gaskey & Olds, P.C.

(57) ABSTRACT

A discloses latch module assembly includes a channel and a bracket supported on the channel. The bracket supports a handle assembly and is movable between a collapsed position and an installed position to enable assembly through small openings within a door. A method of installing a door latch module assembly is also disclosed.

15 Claims, 5 Drawing Sheets

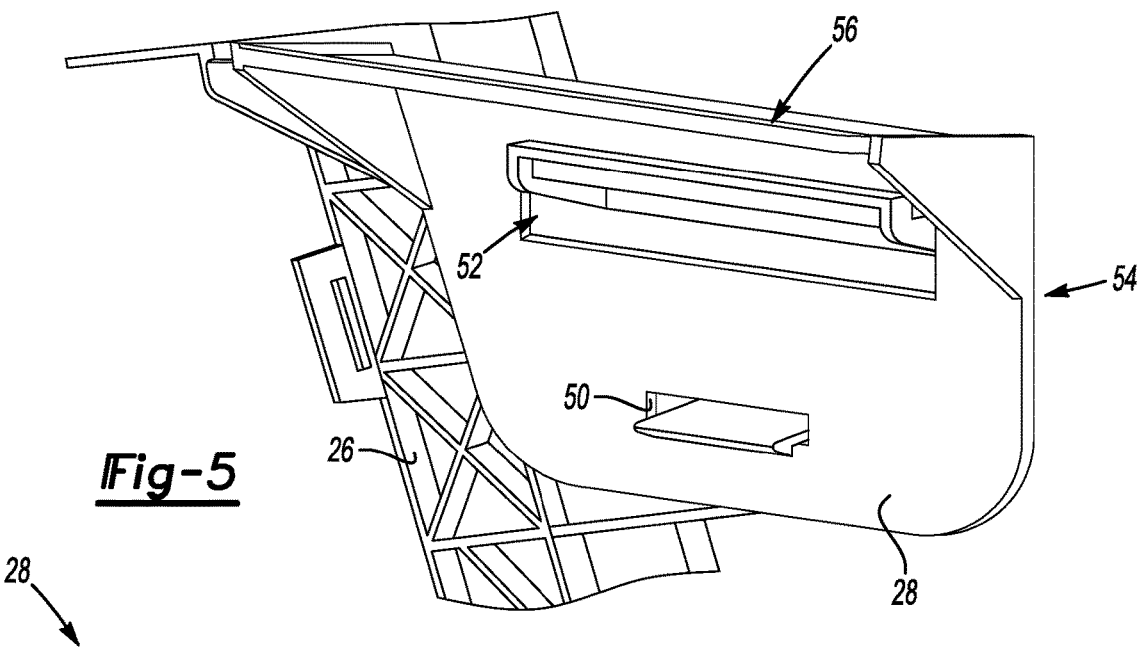
Fig-5
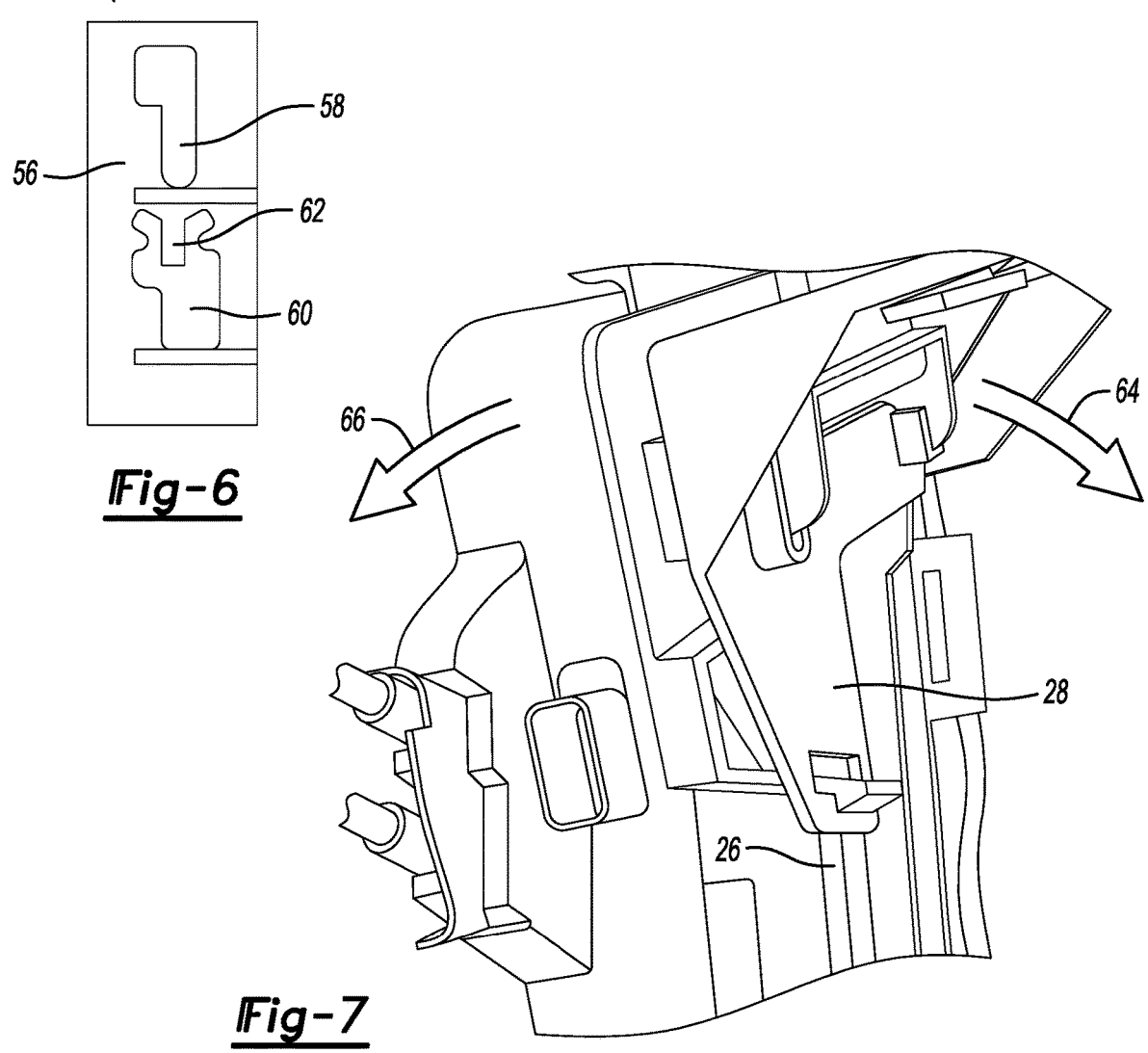
Fig-6
Fig-7

COLLAPSIBLE SIDE DOOR LATCH MODULE

TECHNICAL FIELD

This disclosure relates to a door latch module for a side door that includes features for facilitating assembly.

BACKGROUND

Vehicle door latch modules are assembled into a vehicle door as an assembly including the latch module, door handle and a bracket that supports a portion of the window mechanism as well as any electronic actuators. During assembly, such assemblies are inserted through an opening and secured within the door. The size of the opening is typically large enough to enable the assembly to be inserted through an opening and into the door. However, lighter vehicle designs may include smaller door configurations that have smaller openings for assembly of door components. Smaller openings may not provide sufficient space to efficiently insert and install the door latch modules.

SUMMARY

A latch module assembly for a vehicle door according to an exemplary aspect of the present disclosure includes, among other things, a channel including a tab and catch. The channel is securable within a vehicle door. A bracket is supported on the tab and catch and movable between a collapsed position and an installed position. A handle assembly is attached to the bracket.

In a further non-limiting embodiment of the foregoing latch module assembly, includes a latch module attached to the channel.

In a further non-limiting embodiment of any of the foregoing latch module assemblies, the bracket includes a top supporting the handle assembly and a back wall including a first slot receiving the tab and a second slot receiving the catch In a further non-limiting embodiment of any of the foregoing latch module assemblies, the catch extends outward from the channel and includes a stop limiting movement of the bracket to the installed position.

In a further non-limiting embodiment of any of the foregoing latch module assemblies, the top includes slots receiving tabs of the handle assembly for attaching the handle assembly to the bracket.

In a further non-limiting embodiment of any of the foregoing latch module assemblies, the channel supports a portion of a window mechanism within the vehicle door.

In a further non-limiting embodiment of any of the foregoing latch module assemblies, the latch mechanism is coupled to the handle mechanism through a mechanical link.

In a further non-limiting embodiment of any of the foregoing latch module assemblies, a first width of the channel, bracket and handle assembly in the collapsed position is less than a second width of the channel, bracket and handle assembly in the installed position.

In a further non-limiting embodiment of any of the foregoing latch module assemblies, the vehicle door includes an outer panel and an inner panel defining an opening, and a first interior width between the outer panel and the inner panel around the opening is greater than the first width and less than the second width.

In a further non-limiting embodiment of any of the foregoing latch module assemblies, the vehicle door includes a second interior width between the outer panel and the inner panel where the handle assembly is secured to the vehicle door, the second interior width greater than the first interior width.

A method of installing a door latch module assembly according to another exemplary aspect of the present disclosure includes, among other things, mounting a bracket and handle assembly to a channel for movement between a collapsed position and an installed position. The bracket is compressed to the collapsed position. The channel, bracket and handle assembly is guided through an opening in an inner panel of a door. The bracket is extended to the installed position and securing the handle assembly to the door.

In a further non-limiting embodiment of the foregoing method, includes mounting a latch module to the channel.

In a further non-limiting embodiment of any of the foregoing methods, the channel includes a tab and a catch and mounting the bracket to the channel includes inserting the tab through a first slot in the bracket and the catch through a second slot of the bracket.

In a further non-limiting embodiment of any of the foregoing methods, mounting the handle assembly to the bracket includes inserting taps of the handle assembly into slots defined on a top of the bracket.

In a further non-limiting embodiment of any of the foregoing methods, a first width of the channel, bracket and handle assembly in the collapsed position is less than a second width of the channel, bracket and handle assembly in the installed position.

In a further non-limiting embodiment of any of the foregoing methods, the door includes an outer panel and a first interior width between the outer panel and the inner panel around the opening and compressing the bracket to the collapsed condition includes compressing the bracket, channel and handle assembly to the first width to fit through the first interior width.

In a further non-limiting embodiment of any of the foregoing methods, the door includes a second interior width between the outer panel and the inner panel where the handle assembly is secured to the door, the second interior width is greater than the first interior width and extending the bracket to the installed position includes expanding bracket such that the handle assembly, bracket and channel to the second width that corresponds with the second interior width.

In a further non-limiting embodiment of any of the foregoing methods, includes supporting a portion of a window mechanism on the bracket within the door.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 5 is a perspective view of a bracket mounted to the channel.

FIG. 6 is a top view of the example bracket.

FIG. 7 is a schematic view of the bracket movably mounted to the channel.

DETAILED DESCRIPTION

This disclosure details an exemplary device and method for installing a latch module assembly into a vehicle door. An example embodiment of the latch module assembly and installation method are discussed in detail in reference to figures in the following description.

Although a specific component relationship is illustrated in the figures of this disclosure, the illustrations are not intended to limit this disclosure. In other words, the placement and orientation of the various components are shown schematically and could vary within the scope of this disclosure. In addition, the various figures accompanying this disclosure are not necessarily to scale, and some features may be exaggerated or minimized to show certain details of a particular component.

Figure 1:
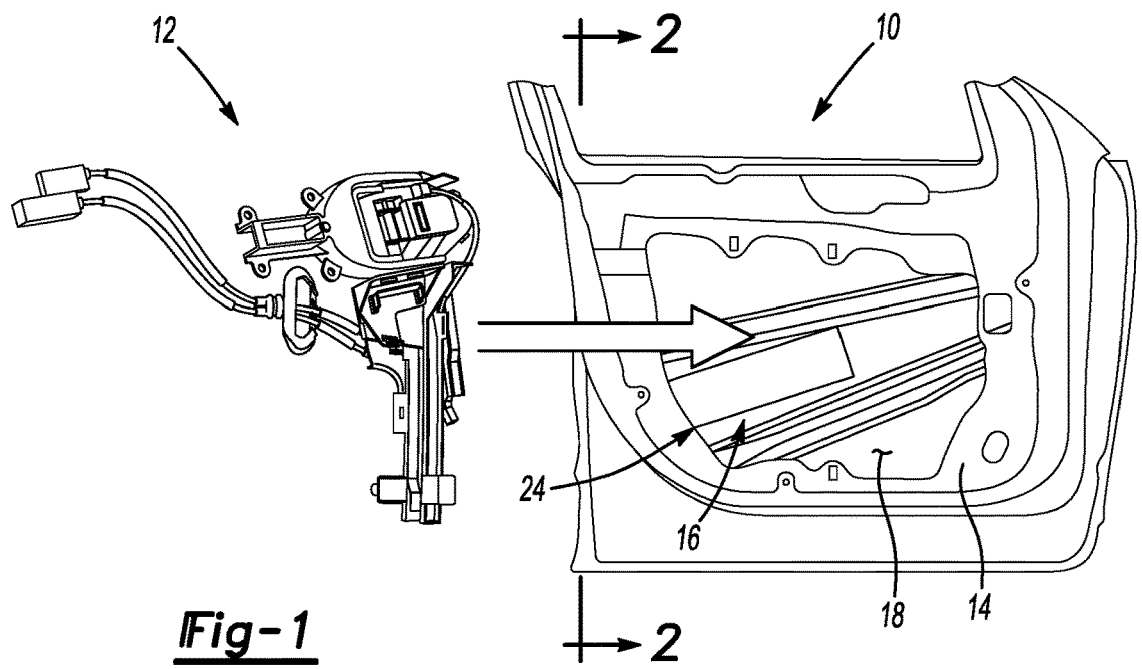
FIG. 1 is a schematic view of a vehicle door and latch module assembly.

Referring to FIG. 1, a vehicle door 10 includes a latch module assembly 12 that includes a handle assembly 30 and a latch module 32 for securing the door 10 in a closed position. The door 10 includes an inner panel 14 and an outer panel 18. The relative terms inner and outer are with reference to a centerline of the vehicle such that portions nearer the centerline of the vehicle are "inner" relative those features and components that are further away from the centerline of the vehicle. Moreover, the door 10 may be any vehicle door, including front and rear doors as well as hatches or other structures that utilize a latch module assembly 12. An opening 16 is defined by a perimeter 24 formed as part of the inner panel 14.

Figure 2:
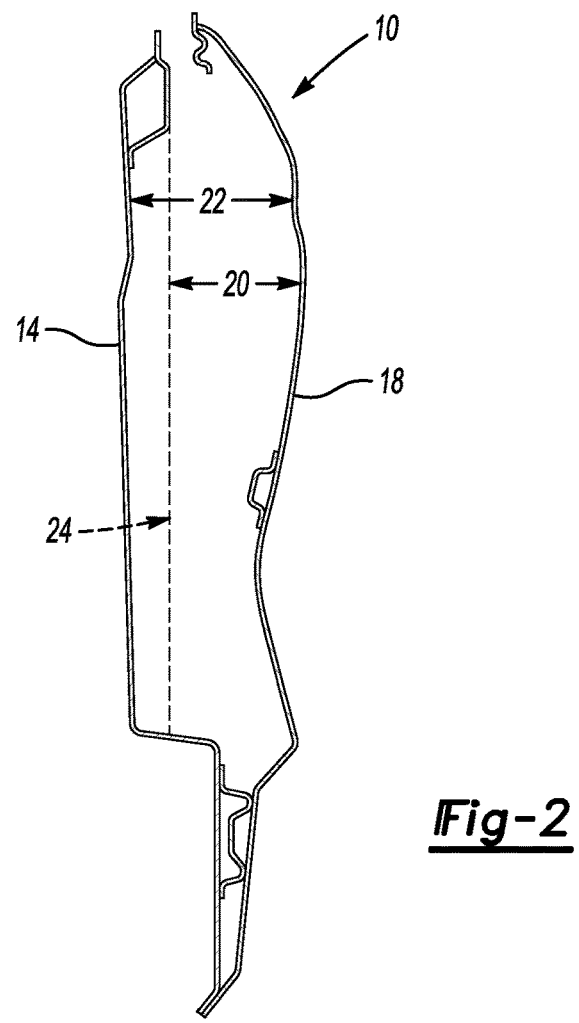
FIG. 2 is a schematic cross-section of an example vehicle door.

Referring to FIG. 2 with continued reference to FIG. 1, the example vehicle door 10 includes a first width 20 disposed about the opening 16 at the perimeter 24 that is smaller than a second width 22. The second width 22 is disposed between the outer panel 18 and the inner panel 14 away from the opening 16 in the location where the latch module assembly 12 is mounted to the door 10. Because the width 20 about the opening 16 is smaller than the width 22 within the door 10, the latch module assembly 12 can be difficult to assemble. The example disclosed latch module assembly 12 includes features for easing assembly and enabling installation through the smaller width 20 provided about the opening 16.

Figure 3:
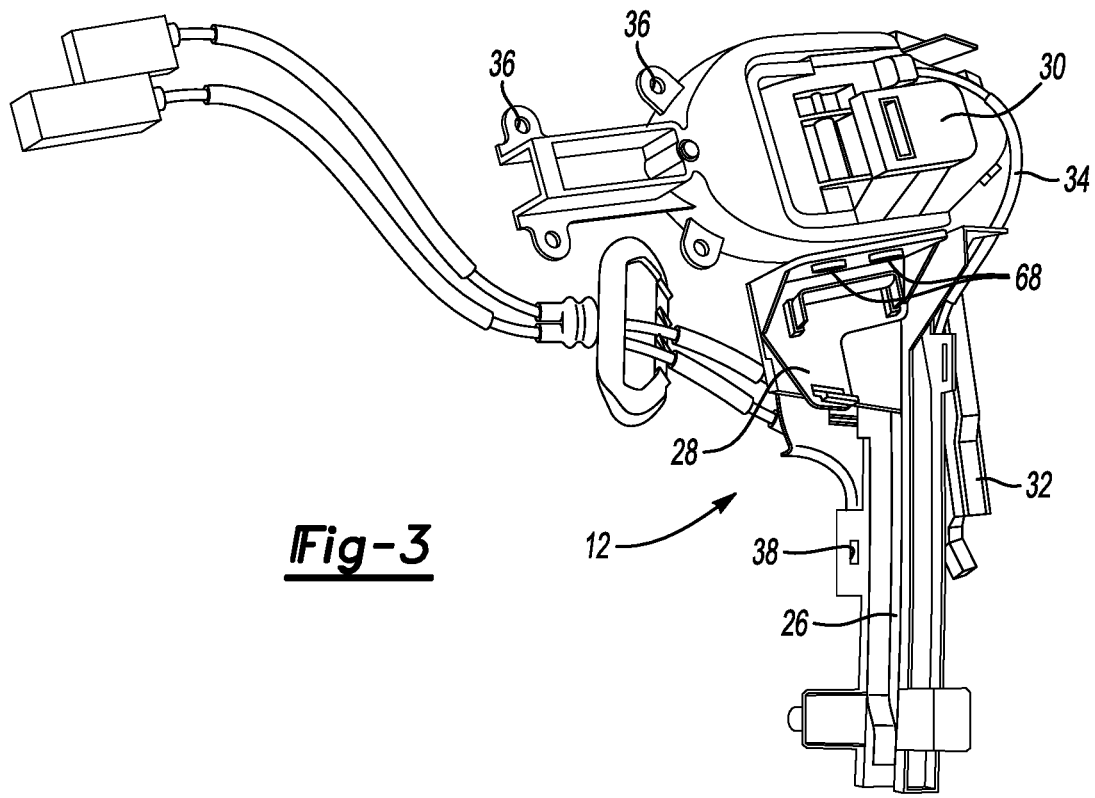
FIG. 3 is a perspective view of an example latch module assembly.

Referring to FIG. 3 with continued reference to FIGS. 1 and 2, the latch module assembly 12 includes a channel 26 that supports the handle assembly 30 and the latch module 32. The latch module 32 provides the mechanical coupling that secures the vehicle door 10 in a closed position. The handle assembly 30 is coupled to the latch module 32 through a mechanical link 34. The handle assembly 30 provides for actuation of the latch module 32 manually from an outer side of the door 10.

In this disclosed example, the latch module 32 includes the mechanical link 34 to the handle assembly 30 but also includes electrical features to provide for actuation of the latch module electronically. The channel 26 is securable to an interior portion of the vehicle door with fasteners, shown schematically in FIG. 9, that extend through several openings such as the opening 38 shown in FIG. 3. The handle assembly 30 also includes openings 36 for fasteners that are utilized for securing the handle assembly 32 as shown schematically in FIG. 9. Interior portions of the door 10 include features for securement of the handle assembly 30 once aligned and positioned within the door 10. The bracket 26 also includes features for securing window mechanism components and possibly providing a portion of a track for a window mounted within the vehicle door.

The handle assembly 30 is secured to a bracket 28 that is in turn mounted to the channel 26. The bracket 28 is secured to the channel 26 in a manner that enables movement of the handle assembly 30 between a collapsed position and an expanded position. In this example, the handle assembly 30 includes tabs 68 that are received within slots of the bracket 28.

Figure 4:
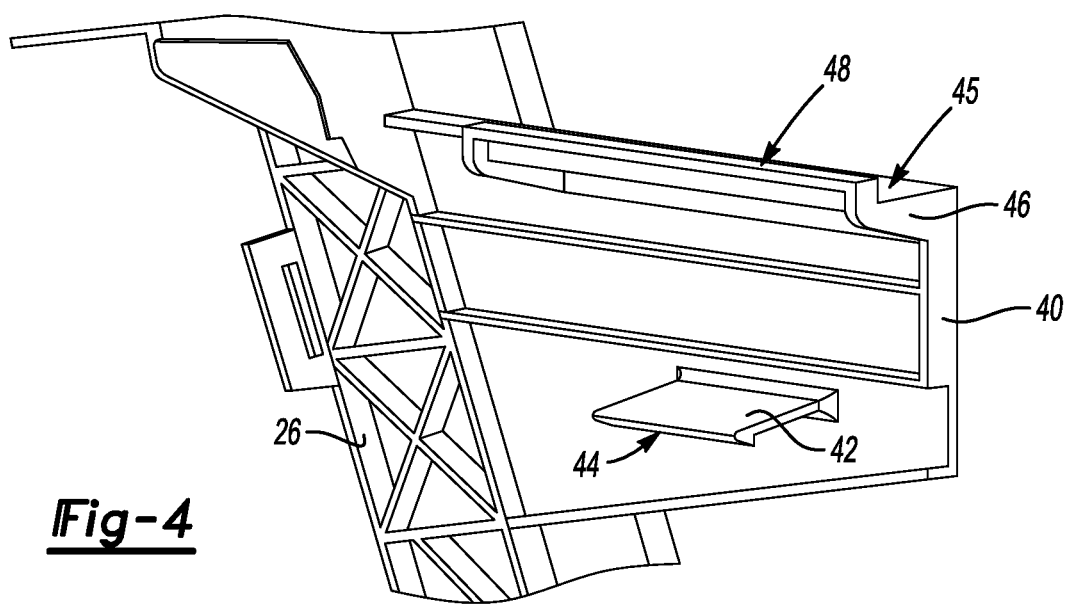
FIG. 4 is a perspective view of a portion of an example channel of the latch module assembly.

Referring to FIGS. 4 and 5 with continued reference to FIG. 3, the example channel 26 includes a mount portion 40 with a first tab 42 including a ramped catch portion 44. The mount portion 40 also includes a catch 46 that includes a stop 48.

Referring to FIG. 5 with continued reference to FIG. 4, the example bracket 28 includes a first slot 50 that receives the first tab 42 and a second slot 52 that receives the catch 46. The bracket 28 includes a back 54 within which is defined the first slot 50 and the second slot 52. A top 56 is provided for mounting of the handle assembly 30.

The second slot 52 is elongated to receive the elongated catch 46. The catch 46 includes a top surface 45 on which the bracket 28 is substantially supported. The bracket 28 is loosely supported on the catch 46 such that the bracket 28 may slide back and forth on the catch 46. The first tab 42 constrains movement of the lower part of the back 54 such that the top 56 may move in a pivoting manner. Although the bracket 28 is supported on the channel 26 to enable relative movement, that movement is limited by the catch 46 and tab 42.

Referring to FIG. 6 with reference to FIGS. 3 and 5, the top 56 includes a mounting slots 58 and 60 and a locking member 62. The tabs 68 are received within the mounting slots 58 and 60 and held in place with the locking member 62. It should be appreciated that although an example mounting configuration of the handle assembly 30 to the bracket 28 is illustrated and described, other configurations and means of mounting the handle assembly 30 could be utilized and are within the contemplation of this disclosure.

Referring to FIG. 7, the example bracket 28 is shown mounted to the channel 26 and is movable on the first tab 42 and the catch 46 between the collapsed position indicted schematically by arrow 66 and an expanded position indicated schematically by arrow 64. In the collapsed position, a width of the handle assembly 30, bracket 28 and channel 26 are of a width that enables assembly into the vehicle door 10. Once installed within the vehicle door 10, the bracket 28 is movable along the channel 26 to allow the handle assembly 30 to move outward to the expanded position for fastening to the door 10.

Figure 8:
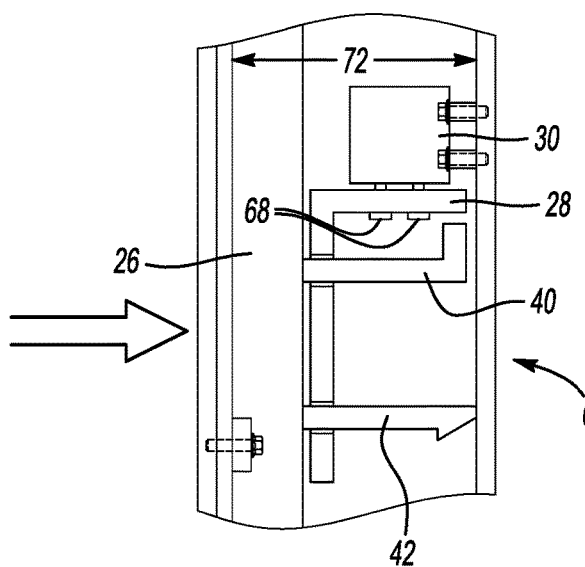
FIG. 8 is a schematic view of the bracket mounted to the channel in a collapsed position.
Figure 9:
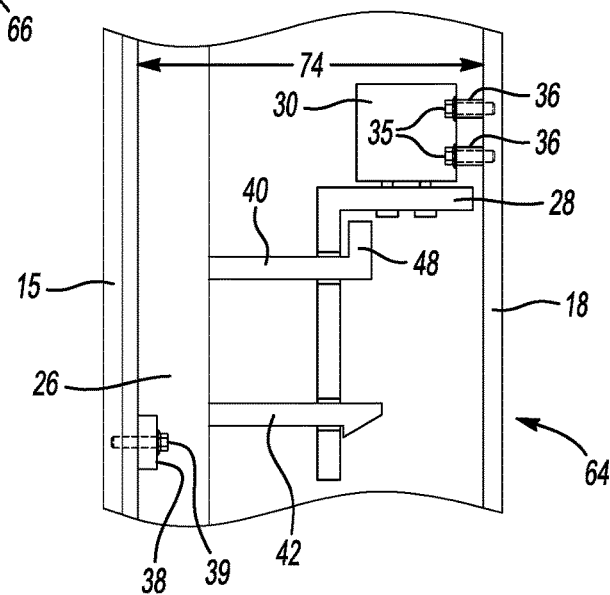
FIG. 9 is a schematic view of the bracket mounted to the channel in the extended position.

Referring to FIGS. 8 and 9 with continued reference to FIGS. 2 and 7, in the collapsed position shown in FIG. 8, the bracket 28 is compressed to define a collapsed width 72. The collapsed width 72 includes the handle assembly 30, the bracket 28 and the channel 26. In the collapsed width 72, the handle assembly 30, bracket 28 and channel 26 are of a width that is less than the width 20 in the door 10 such that the latch module assembly 12 can be guided into the interior space between inner panel 14 and outer panel 18 without obstruction and with sufficient clearance to ease assembly.

Referring to FIG. 9, the latch module assembly 12 is shown in an expanded or installed position where the handle assembly 30, bracket 28 and channel 26 are expanded to the expanded width 74. The installed width 74 is greater than the collapsed width 72 and provides for positioning of the handle assembly 30 within a width 22 of the door 10 that corresponds with the installed position. The bracket 28 is movable on the tab 42 and catch 46 to enable expansion between the collapsed and expanded widths 72, 74. The movement of the bracket 28 is not immovably fixed to the channel 26. Instead, the bracket 28 is movable relative to the channel 26 and limited by the catch portion 44 of the first tab 42 and the stop 48 of the catch 46.

Once in the assembled position shown in FIG. 9, fasteners 35 are extended through openings 36 to secure the handle assembly 30 in place. The bracket 28 no longer is relied on to support the handle assembly 30. The attachment of the fasteners 35 is shown schematically and it should be understood that the door 10 will include locations for mounting the handle assembly 30 as required to enable access and operation. Additionally, the channel 26 is secured to a portion of the door schematically shown at 15 by fastener 39 inserted through opening 38. The portion 15 within the door 10 is tailored to each specific door shape, size and configuration that are all within the contemplation of this disclosure.

The handle assembly 30 is biased outward toward the expanded position by structures such as the mechanical link 34. Accordingly, compression to the collapsed condition 66 requires application of some force to both move and hold the handle assembly 30 in the position shown in FIG. 8. Once the force is removed, the handle assembly 30 moves at least partially toward the expanded position 64 shown in FIG. 9.

Figure 10:
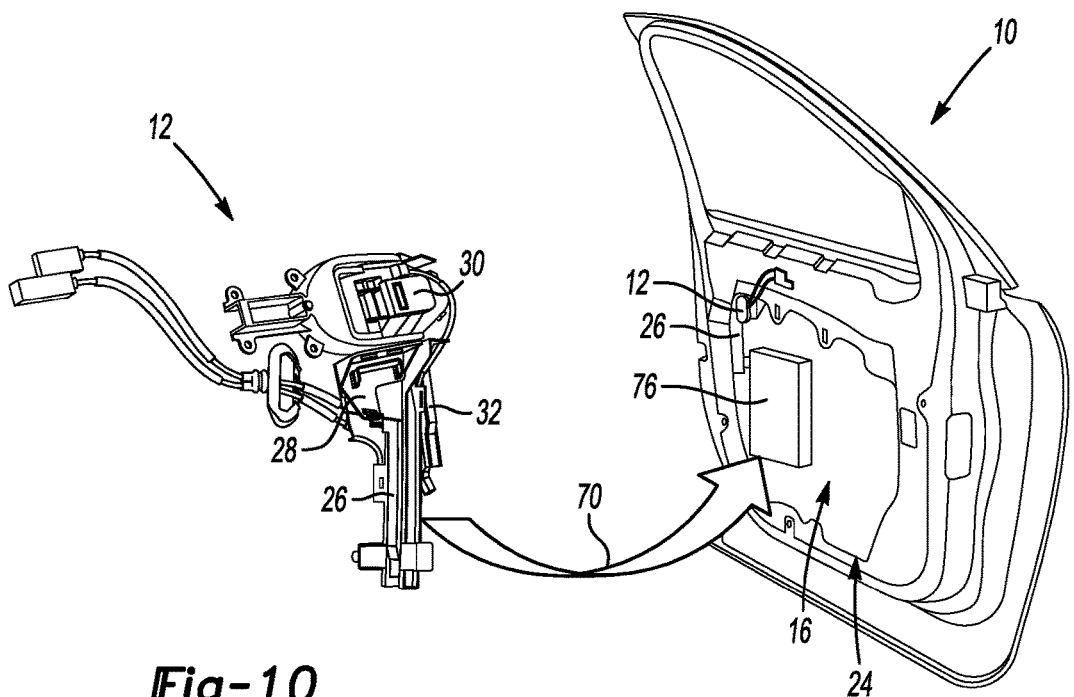
FIG. 10 is a schematic view of a method of installing the latch module assembly into vehicle door 10.

Referring to FIG. 10 with continued reference to FIGS. 8 and 9, an example method of assembling the latch assembly 12 into the vehicle door 10 includes a first step of collapsing the handle assembly 30 and bracket 28 into the collapsed position 66 as is shown in FIG. 8. In the collapsed position 66, the latch module assembly 12 is guided into the door 10 as is schematically indicated by arrow 70. The door 10 includes the opening 16 with the perimeter 24 about the opening 16 that defines the width 20 (FIG. 2) that is smaller than the desired installation width but larger than the collapsed width 72 of the latch module assembly 12. Accordingly, in the collapsed position 66, the latch module assembly 12 has sufficient clearance to enable efficient guiding through the opening 16 into the interior space of the door 10.

Once the latch module assembly 12 has been guided into the door, the channel 26 is secured within the door 10 utilizing fasteners 39 or other attachment devices as may be utilized and understood by those skilled in the art. A window and or portion of a window operating mechanism schematically shown at 76 may be attached to or supported on the channel 26 once installed within the door 10.

Figure 11:
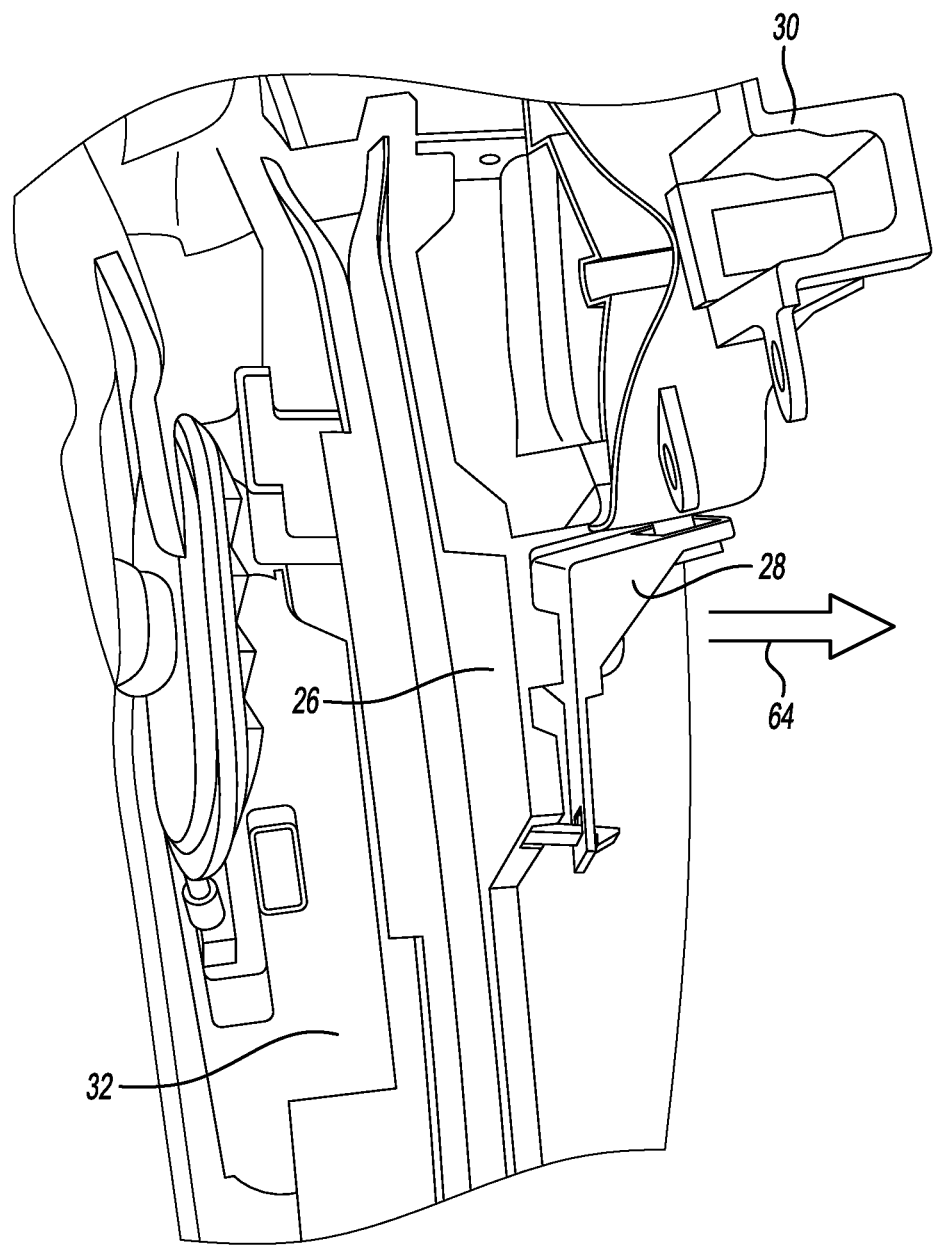
FIG. 11 is another schematic view illustrating expanding of the bracket to the expanded position.

Referring to FIG. 11 with continued reference to FIGS. 8, 9 and 10, once the channel 26 has been secured into the door 10, the handle assembly 30 is expanded outwardly to the expanded installed position 64 to the extended width 74. In the expanded position the handle assembly 30 is secured to the door 10 with fasteners 35 as shown schematically in FIG. 9. The bracket 28 is not mounted or fixedly secured to the channel 26 and enabled to move freely to allow adjustment of a position of the handle assembly 30 for securement within the vehicle door 10.

Accordingly, the disclosed example bracket 28 and channel 26 connection enable the latch module assembly to be collapsed into a condition that enables assembly into smaller opening sizes while maintaining a desired orientation and greater width once assembled into a door.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A latch module assembly for a vehicle door comprising:
a channel including a tab and catch, the channel securable within a vehicle door;
a bracket supported on the tab and catch and movable between a collapsed position and an installed position, the bracket includes a top supporting the handle assembly and a back including a first slot receiving the tab and a second slot receiving the catch; and
a handle assembly attached to the bracket, wherein the top includes slots receiving tabs of the handle assembly for attaching the handle assembly to the bracket.

2. The latch module assembly as recited in claim 1, including a latch module attached to the channel.

3. The latch module assembly as recited in claim 1, wherein the catch extends outward from the channel and includes a stop limiting movement of the bracket to the installed position.

4. The latch module assembly as recited in claim 1, wherein the channel supports a portion of a window mechanism within the vehicle door.

5. The latch module assembly as recited in claim 4, wherein the latch mechanism is coupled to the handle mechanism through a mechanical link.

6. The latch module assembly as recited in claim 1, wherein a first width of the channel, bracket and handle assembly in the collapsed position is less than a second width of the channel, bracket and handle assembly in the installed position.

7. The latch module assembly as recited in claim 6, wherein the vehicle door includes an outer panel and an inner panel defining an opening, and a first interior width between the outer panel and the inner panel around the opening is greater than the first width and less than the second width.

8. The latch module assembly as recited in claim 7, wherein the vehicle door includes a second interior width between the outer panel and the inner panel where the handle assembly is secured to the vehicle door, the second interior width greater than the first interior width.

9. A latch module assembly for a vehicle door comprising:

a channel including a tab and catch, the channel securable within a vehicle door;

a latch module attached to the channel;

a bracket movably supported on the channel, the bracket including a top and a back including a first slot receiving the tab and a second slot receiving the catch of the channel;

a handle assembly attached to the bracket and movable relative to the channel and latch module between a collapsed position and an installed position.

10. The latch module assembly as recited in claim 9, wherein the catch extends outward from the channel and includes a stop limiting movement of the bracket to the installed position.

11. The latch module assembly as recited in claim 9, wherein the channel supports a portion of a window mechanism within the vehicle door.

12. The latch module assembly as recited in claim 9, wherein the latch mechanism is coupled to the handle mechanism through a mechanical link.

13. The latch module assembly as recited in claim 9, wherein a first width of the channel, bracket and handle assembly in the collapsed position is less than a second width of the channel, bracket and handle assembly in the installed position.

14. The latch module assembly as recited in claim 13, wherein the vehicle door includes an outer panel and an inner panel defining an opening, and a first interior width between the outer panel and the inner panel around the opening is greater than the first width and less than the second width.

15. The latch module assembly as recited in claim 14, wherein the vehicle door includes a second interior width between the outer panel and the inner panel where the handle assembly is secured to the vehicle door, the second interior width greater than the first interior width.

* * * * *